United States Patent
McGarvey et al.

(10) Patent No.: US 7,852,402 B2
(45) Date of Patent: *Dec. 14, 2010

(54) METHOD AND APPARATUS FOR CAPTURING HIGH QUALITY LONG EXPOSURE IMAGES WITH A DIGITAL CAMERA

(75) Inventors: James E. McGarvey, Hamlin, NY (US); Bruce H. Pillman, Rochester, NY (US); Craig M. Smith, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/434,116

(22) Filed: May 1, 2009

(65) Prior Publication Data

US 2009/0278964 A1  Nov. 12, 2009

Related U.S. Application Data

(62) Division of application No. 10/967,944, filed on Oct. 19, 2004, now Pat. No. 7,602,438.

(51) Int. Cl.
*G03B 7/12* (2006.01)
(52) U.S. Cl. ........................ 348/362; 348/243; 396/215
(58) Field of Classification Search ................. 348/222, 348/247, 243, 298, 362–364, 241, 296–297; 396/65, 215
See application file for complete search history.

(56) References Cited

U.S. PATENT DOCUMENTS

| | | | |
|---|---|---|---|
| 5,264,940 A | 11/1993 | Komiya et al. | |
| 5,745,808 A * | 4/1998 | Tintera | 396/236 |
| 6,040,858 A | 3/2000 | Ikeda | |
| 6,683,643 B1 * | 1/2004 | Takayama et al. | 348/247 |
| 6,710,807 B1 | 3/2004 | Yamagishi | |
| 6,710,808 B1 * | 3/2004 | Yamagishi | 348/362 |
| 6,982,757 B2 * | 1/2006 | Tariki | 348/243 |
| 7,133,072 B2 | 11/2006 | Harada | |
| 7,239,805 B2 | 7/2007 | Uyttendaele et al. | |
| 7,265,786 B2 * | 9/2007 | Venturino et al. | 348/333.02 |
| 7,301,572 B2 | 11/2007 | Kitani | |
| 2002/0030754 A1 * | 3/2002 | Sugimoto | 348/333.02 |
| 2003/0095189 A1 | 5/2003 | Liu et al. | |
| 2003/0206241 A1 | 11/2003 | Serizawa et al. | |
| 2003/0210344 A1 | 11/2003 | Bloom | |
| 2003/0214590 A1 | 11/2003 | Matherson | |
| 2004/0036775 A1 | 2/2004 | Watson, Jr. et al. | |

* cited by examiner

*Primary Examiner*—Lin Ye
*Assistant Examiner*—Trung Diep
(74) *Attorney, Agent, or Firm*—Peyton C. Watkins

(57) ABSTRACT

A digital camera captures high quality long exposure images by capturing and summing several images of the same scene. The effective ISO of the camera is reduced by scaling the summed image, thus reducing image noise and improving long exposure quality.

25 Claims, 6 Drawing Sheets

METHOD AND APPARATUS FOR CAPTURING HIGH QUALITY LONG EXPOSURE IMAGES WITH A DIGITAL CAMERA

CROSS-REFERENCE TO RELATED APPLICATION

This is a Divisional of application Ser. No. 10/967,944 filed Oct. 19, 2004 now U.S. Pat. No. 7,602,438.

FIELD OF THE INVENTION

The present invention relates to a digital still camera and, in particular, to a digital still camera which uses a special mode to capture long time exposures.

BACKGROUND OF THE INVENTION

A digital camera which stores the image of a scene in the form of digital data is well known. In such a camera, the optical image of the scene is converted to an analog electrical signal in a CMOS or CCD image sensor. The analog signal is converted to digital form for further processing, compression and storage as an image file on a memory card or other storage device incorporated into the camera.

Besides the analog image signal, a dark signal also accumulates due to thermal excitation of electrons within the sensor substrate. Because this phenomenon is most noticeable under no-light conditions, these generated electrons are called "dark current". As such, a dark current signal is not a random noise, but an error in the form of a specified offset. Thus, corrections for each dark current signal may be made by subtracting values from a dark frame. Nonetheless, a high dark current signal may limit the usable sensitivity of the sensor since the image modulation will begin to get lost in the noise from increased dark current, that is, signal to noise in the shadows will be diminished.

Moreover, the level of dark current is a function of temperature, and the warmth of the image sensor chip directly influences the number of electrons generated. The amount of dark current approximately doubles for every 8° C. increase in temperature. Since the amount of dark current is directly related to each pixel site, mostly by levels of defects, there is a fixed pattern offset signal across a sensor for a given temperature and integration time.

While the offset due to the dark current signal can be corrected by subtracting current values obtained from a dark frame exposed at the same temperature and for the same integration time as the image frame, the effects of dark current are more complicated and cannot be corrected so easily. In a single pixel measurement over time, the amount of dark current generated over several frames will follow a statistical distribution; this variation is commonly called dark current shot noise. This noise arises from the quantum (statistical) nature of the thermal electrons produced in the sensor. Thus, while the fixed pattern noise is easy to subtract, the shot noise is random and will remain to an extent after fixed pattern subtraction.

Consequently, it is known in the literature of dark current noise reduction (see, e.g., the background discussion in United States Patent Application Publication US 2003/0210344 A1) to take multiple dark frame images, usually more than five, average the dark frame images pixel-by-pixel, and then subtract the averaged dark frame from the image frame to create an image with reduced dark current noise. The fixed pattern offset component is automatically corrected by the subtraction and, since the shot noise is statistical, the shot noise is reduced by combining data from the multiple measurements. Essentially, by this approach, shot noise is reduced by a factor equal to the square root of the number of measurements combined.

Furthermore, as referenced in United States Patent Application Publication US 2004/0036775 A1, a known, and similar, technique of noise reduction in relation to image frames is the ensemble averaging of images having the identical exposure time. By this method, a series of subject images having the same exposure time are acquired. The values of corresponding pixels from each of these images are summed and divided by the number of images to compute the arithmetic mean of the image set. As with the dark frame example, this method reduces random noise such as shot noise by the square root of the number of images averaged.

Accordingly, it is well known that solid state image sensors of the type commonly used in consumer digital cameras exhibit dark current which when integrated over the exposure period adds both a fixed pattern offset signal and a random (shot) noise signal to the image signal. Many photographic applications require very long exposure times. As exposure times increase, digital cameras become unusable as image noise increases or the imager becomes saturated with dark current signal. This is a particular problem with the popular complementary metal oxide semiconductor (CMOS) image sensors. For example, while an 8 second exposure may leave adequate headroom (above the dark current level and below the saturation level) for an image signal in a charge coupled device (CCD) image sensor, dark current in a CMOS image sensor will completely saturate the pixels.

Various methods have been incorporated to solve this problem. The most effective method is to capture multiple frames of the image, reading each frame from the imager while integrating the signal for the next frame. The frames are each converted to digital data and summed to produce a final digital image. This method permits an indefinite extension of the exposure time, as the imager is cleared of dark current signal as each frame is read out. Of course, the dark current signal will still accumulate in the image sensor for each exposure but the image signal is now measurable since the exposure time of an individual image frame has been shortened. As a result, there is adequate "headroom" between the noise floor and the level at which the sensor pixels will go into saturation.

While the captured image frames are typically corrected for the remaining dark current signal in one of the aforementioned ways, it would be desirable to have a more robust correction for the random (shot) noise associated with the dark current signal in such situations.

SUMMARY OF THE INVENTION

The present invention is directed to overcoming one or more of the problems set forth above. Briefly summarized, according to one aspect of the invention, the invention comprises a method for capturing a long exposure with a digital camera by dividing the long exposure into a plurality of shorter exposures, wherein the digital camera includes an image sensor that (a) is assigned an inherent ISO speed rating that determines at least in part an overall photographic exposure upon the image sensor, and (b) generates an image signal for each shorter exposure and a dark current comprising both a fixed pattern offset component and a random noise component. The method according to the invention comprises the steps of (a) increasing the overall photographic exposure upon the image sensor; (b) capturing the shorter exposures as a plurality of image frames; (c) generating an image representation of the long exposure from the plurality of image frames; (d) generating a representation of the dark current in the plurality of image frames; (e) processing the image representation and the representation of the dark current in order to remove the fixed pattern offset component of the dark current from the image representation, thereby generating a processed image representation; and (f) scaling the processed image representation proportional to the increased overall photographic exposure whereby the scaling additionally reduces the random noise component in the image representation.

In a further aspect of the method, the step (a) of increasing the overall photographic exposure upon the image sensor comprises reducing the ISO speed rating for the shorter exposures below the inherent ISO speed rating such that the image signal for each shorter exposure accumulates to a greater extent than it would, had the inherent ISO speed rating been used; and the step (f) of scaling the image representation comprises scaling the image representation proportional to the reduced ISO speed rating whereby the scaling additionally reduces the random noise component in the image representation.

According to another aspect, the invention comprises a digital camera having a user interface for reducing the ISO speed rating for the shorter exposures; an imaging stage for capturing the shorter exposures as a plurality of image frames; and a processing stage for (a) generating an image representation of the long exposure from the plurality of image frames, (b) generating a representation of the dark current in the plurality of image frames, (c) processing the image representation and the representation of the dark current in order to remove the fixed pattern offset component of the dark current from the image representation, and (d) scaling the image representation proportional to the reduced ISO speed rating whereby the scaling additionally reduces the random noise component in the image representation.

The present invention is an improvement to the prior art multiple frame method, and possesses the technical advantage of providing lower noise and thus improved image quality when using long exposure times. This is achieved by increasing the overall photographic exposure and scaling the resulting digital image. Scaling reduces the image noise and thus improves image quality over a single frame capture of shorter exposure time. To increase the exposure, the effective speed of the imager (i.e. ISO speed) is reduced below that which would produce an optimal signal level in the imager for a single frame capture. This method is ideal where long exposure time is desired for photographic effect and not because of limited light. For example, it is possible to create an image of a busy street where the street appears deserted because the moving people and vehicles disappear due to the long exposure. In this example, the street is illuminated by bright daylight and the photographer simply desires the longest possible exposure time.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 1:
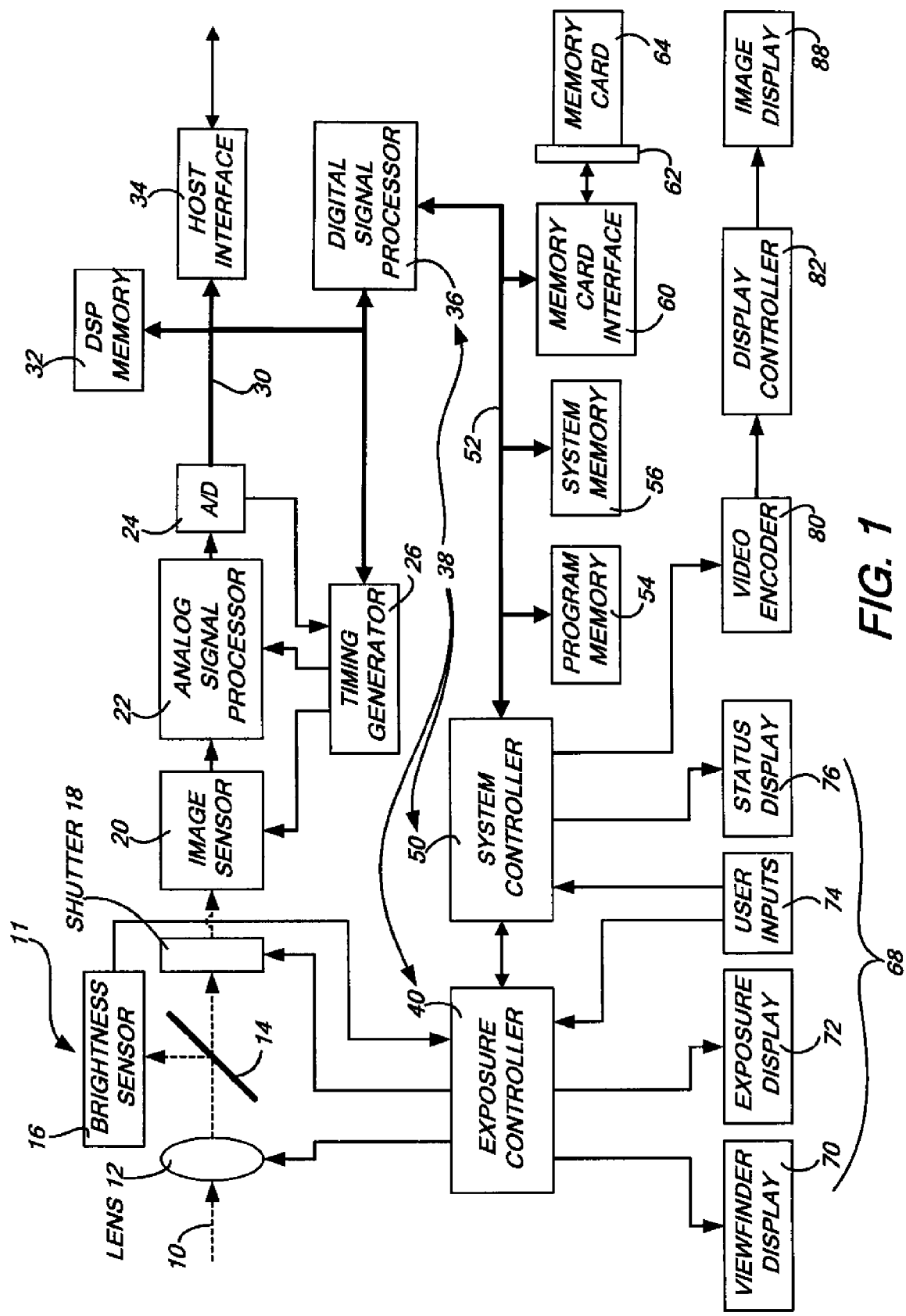
FIG. 1 shows a block diagram of a digital camera embodying the present invention.

A block diagram of a digital camera embodying the present invention is shown in FIG. 1. In such a camera, light 10 from the subject scene is input to an imaging stage 11, where the light is focused by lens 12 to form an image on solid state image sensor 20. Mirror 14 normally directs the light to viewfinder optics (not shown) and to brightness sensor 16 for light metering. During exposure, mirror 14 is raised, allowing the light 10 to pass through focal plane shutter 18 to image sensor 20. This description of a single lens reflex SLR camera will be familiar to one skilled in the art, and it will be obvious that many variations and additional features may be present. For example, an autofocus system may be added, or the lens may be detachable and interchangeable. Although an SLR camera is illustrated, the present invention may be applied to any type of digital camera, where similar functionality may be provided by alternative components. For example, the digital camera could be a relatively simple point and shoot digital camera without the mirror 14, where the brightness sensor 16 obtains a sample of image light by other means. Also, the shutter 18 could be a relatively simple movable blade shutter, or the like, instead of the more complicated focal plane arrangement. Other differences would be apparent to those of skill in this art.

Image sensor 20 converts the incident light to an electrical charge for each picture element (pixel). The charges are then converted to a varying voltage signal as the image is read out of the sensor 20. The preferred embodiment of the present invention applies to a complementary metal oxide semiconductor (CMOS) image sensor, although it will be obvious that the invention could be adapted for other sensor types, particularly charge coupled device (CCD) sensors.

The analog signal from image sensor 20 is processed by analog signal processor 22 and applied to analog to digital (A/D) converter 24. Timing generator 26 produces various clocking signals to select rows and pixels and synchronizes the operation of analog signal processor 22 and A/D converter 24. The resulting stream of digital pixel values are stored in memory 32 associated with digital signal processor (DSP) 36.

Digital signal processor 36 is one of three processors or controllers in this embodiment, in addition to system controller 50 and exposure controller 40. While this partitioning of camera functional control among multiple controllers and processors is typical, these controllers or processors may be combined in various ways without affecting the functional operation of the camera and the application of the present invention. These controllers or processors may comprise one or more digital signal processor devices, microcontrollers, programmable logic devices, or other digital logic circuits. While a combination of such controllers or processors has been described, it should be apparent that one controller or processor may be designated to perform all of the needed functions. All of these variations may perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. Memory 32 consists of any type of random access memory, such as SDRAM.

A bus 30 comprising a pathway for address, data and control signals, connects DSP 36 to its related memory 32, A/D converter 24, timing generator 26, host interface 34 and other related devices. Host interface 34 provides a high speed connection to a personal computer (PC) or other host computer for transfer of image data for display, storage, manipulation or printing. This interface may be an IEEE1394 or USB2.0 serial interface or any other suitable digital interface.

System controller 50 controls the overall operation of the camera based on a software program stored in program memory 54, which may consist of Flash EEPROM or other nonvolatile memory. This memory may also be used to store image sensor calibration data, user setting selections and other data which must be preserved when the camera is turned off. System controller 50 controls the sequence of image capture by directing exposure controller 40 to operate the lens 12, mirror 14 and shutter 18 as previously described, and directing DSP 36 to control the image sensor 20 and process the captured image data. After an image is captured and processed, the final image file stored in memory 32 may be transferred to a host computer via interface 34, stored on a removable memory card 64 or other storage device, and displayed for the user on image display 88.

A bus 52 comprising a pathway for address, data and control signals, connects system controller 50 to DSP 36, program memory 54, system memory 56, memory card interface 60 and other related devices. Memory card 64 is typically a Compact Flash (CF) card inserted into socket 62 and connected to the system controller 50 via memory card interface 60. Other types of storage which may be utilized include without limitation PC-Cards, MultiMedia Cards (MMC), Secure Digital (SD) cards, etc.

Processed images may be copied to a display buffer in system memory 56 and continuously read out via video encoder 80 to produce a video signal. This signal may be output directly from the camera for display on an external monitor, or processed by display controller 82 and presented on image display 88. This display is typically an active matrix color liquid crystal display (LCD), although other types of displays may be used as well.

The user interface, comprising all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touchscreens. Control of light metering, exposure mode, autofocus, etc. is performed by the exposure controller 40. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide a exposure meter function for the user to refer to when manually setting the ISO speed rating, aperture and shutter speed. In this case, as the user changes one or more settings, the light meter indicator presented on viewfinder display 70 tells the user to what degree the image will be over or under-exposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure level of a digital still camera is determined by the exposure time, the lens aperture, the lens transmittance, the level and spectral distribution of the scene illumination, and the scene reflectance. When an image from a digital still camera is obtained using an insufficient exposure, proper tone reproduction can generally be maintained by increasing the electronic or digital gain, but the image will contain an unacceptable amount of noise. As the exposure is increased, the gain can be decreased, and therefore the image noise can normally be reduced to an acceptable level. If the exposure is increased excessively, the resulting signal in bright areas of the image may exceed the maximum signal level capacity of the image sensor or camera signal processing. This can cause image highlights to be clipped to form a uniformly bright area, or to bloom into surrounding areas of the image. Therefore, it is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

Relative to the present invention, note that reducing the ISO setting (from its inherent value) will cause the exposure controller 40 to increase the exposure time or enlarge the aperture of the lens to increase the total exposure on the image sensor. This is in keeping with the understanding derived from film-based imaging systems that a lowered ISO setting corresponds to a less sensitive imaging system, thereby requiring a greater exposure to maintain equivalence with the required overall exposure.

The foregoing description of a digital SLR camera will be familiar to one skilled in the art. It will be obvious that there are many variations of this embodiment which are possible and may be selected to reduce the cost, add features or improve the performance of the camera. The following description will disclose in detail the operation of this camera for capturing long exposure images according to the present invention. As mentioned before, this description is without limitation as to the type of camera used, that is, the invention may be practiced with any type of digital camera that allows variable exposure settings, whether an SLR camera or some other kind.

A number of individual frames are captured and processed to produce a single image. The frame capture sequence will be described first, followed by a description of the processing.

Figure 2:
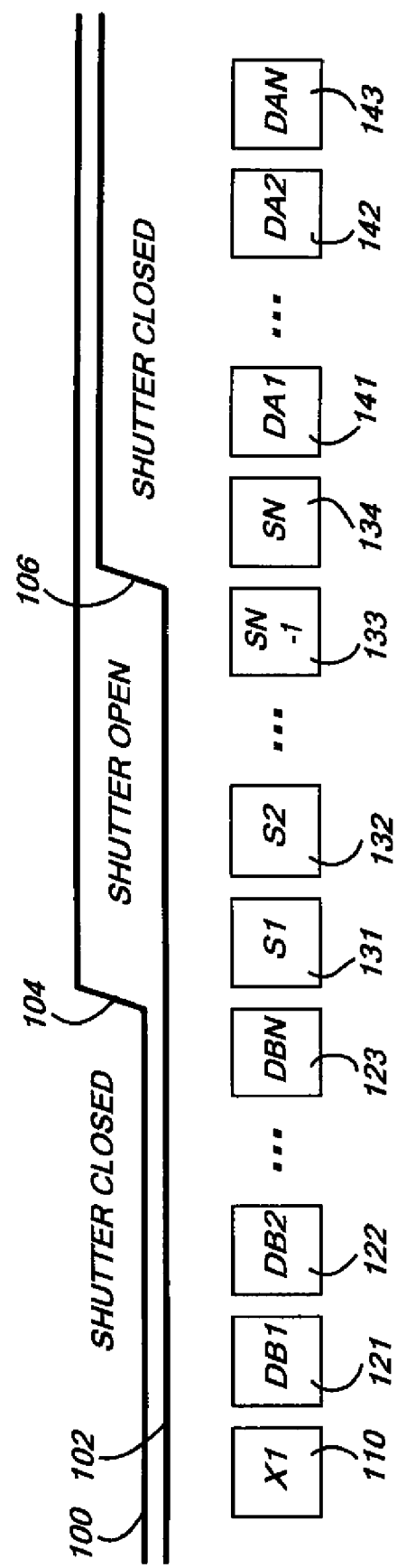
FIG. 2 illustrates the capture of a plurality of image frames and dark frames using the camera shown in FIG. 1 in accordance with the invention.

FIG. 2 illustrates the frame capture sequence employed to capture a long exposure image by dividing the longer exposure into a plurality of shorter exposures. A frame is defined as a single readout of the image sensor, providing a single raw image. Dark frames are read out without opening the shutter 18 and exposing the image sensor 20 to light. Therefore, they do not contain an image of the scene, but only a pattern produced by the dark current of the image sensor. (Dark frame capture is offered without limitation by way of example, that is, there are other ways of obtaining a representation of the dark current, e.g., masked-off pixels on the edge of the image sensor may be used to generate a representation of the dark current.) Scene frames are captured while the shutter is open and thus contain both an image of the scene as well as the dark current pattern and the shot noise. In the subsequent processing, the dark frames are used to remove the effective dark current pattern from the scene frames to produce a high quality final image.

The present embodiment uses a CMOS image sensor. In this type of sensor, light is detected by photosites which convert incident photons to an electron charge stored in the photosite as in a capacitor. When the image is read out, each photosite is sequentially connected to an output charge converter, which produces a voltage corresponding to the charge contained in the photosite. In a CMOS sensor, the image may be read out while light is incident on the sensor. In this case, the charge read out corresponds to the integration of all light incident on that photosite since the last time it was read. Since the photosites are read out sequentially, the top of the frame is read out first and the bottom last, with a significant time difference between them, hence a difference in integrated light. The effect of this difference will be explained as the capture sequence is described.

Referring to FIG. 2, the operation of the focal plane shutter 18 is illustrated by lines 100 and 102. As is well known, a focal plane shutter contains first and second curtains, which operate independently to expose and cover the sensor. The first curtain (100) opens at 104, to begin the exposure. The second curtain (102) closes at 106 to end the exposure. The long exposure capture sequence comprises a number of dark frames 110 to 123 captured before the shutter opens at 104, a number of scene frames 131 to 134 captured while the shutter is open, followed by additional dark frames 141 to 143 captured after the shutter closes at 106.

The number of frames captured in each phase is a function of the desired exposure time, the desired image quality, and the readout time of the image sensor. In the present example, the readout time of the image sensor is ½ second. This means it takes ½ second to scan all of the photosites of the image sensor and convert the stored charge to a voltage, convert the voltage to a digital value and store the values in memory. The effective exposure time of a long exposure image will be a multiple of this readout time. In the preferred embodiment, the number of scene frames captured is one more than the number captured while the shutter is open. This is because the first scene frame S1 (131) captured after the shutter opens (104) and the last scene frame SN (134) captured after the shutter closes (106) are not uniformly illuminated. When the shutter opens, all photosites begin integrating light at approximately the same instant. The readout of frame S1 begins immediately and takes ½ second, so the first photosites readout from the top of the sensor have integrated very little light, while the last photosites from the bottom of the sensor have been illuminated about ½ second. The reverse situation is true for scene frame SN, captured after the shutter closes. When the shutter closes, the sensor was just readout for frame SN−1, so the photosites at the bottom have integrated very little light, while those at the top have been exposed for ½ second. Thus, frame S1 and frame SN contain complementary nonuniform images of the scene. It will be obvious that the sum of these two frames will approximate the image contained in frames S2 through SN−1. Thus, the number N is one more than the number of ½ second intervals that the shutter is open. For example, for a 2 second exposure (the long exposure), the shutter is open for 2 seconds, but 5 scene frames (the shorter exposures), S1 through S5 are captured. The total scene frame capture time is thus 2.5 seconds.

In addition to the scene frames, dark frames are captured to provide data for the correction of the dark current pattern present in each scene frame. In the preferred embodiment, the number of dark frames is equal to the number of scene frames. Since the dark frames will be averaged, the random noise in the resulting dark image is reduced by capturing more dark frames. However, the user must wait while dark frames are captured and there is a diminishing improvement as more and more frames are averaged, so the number of dark frames is limited. Dark frames are captured before and after the scene frames to allow compensation for the increase in dark current resulting from the temperature of the image sensor increasing during the readout of scene frames. This will be more fully explained in the description of the processing. Half of the desired dark frames are captured before the shutter 18 opens and half after the shutter 18 closes. Because the image sensor 20 is initially reset or cleared of charge very rapidly, the first dark frame read out does not uniformly integrate dark current and is discarded.

Referring again to FIG. 2, the complete long exposure capture sequence is as follows:
1) Dark frame X1 (110) is read out and discarded.
2) Dark frames DB1 (121) through DBN (123) are read out.
3) The shutter is opened (104).
4) Scene frames S1 (131) through SN−1 (133) are read out.
5) The shutter is closed (106).
6) Scene frame SN (134) is read out.
7) Dark frames DA1 (141) through DAN (143) are read out.

Figure 3A:
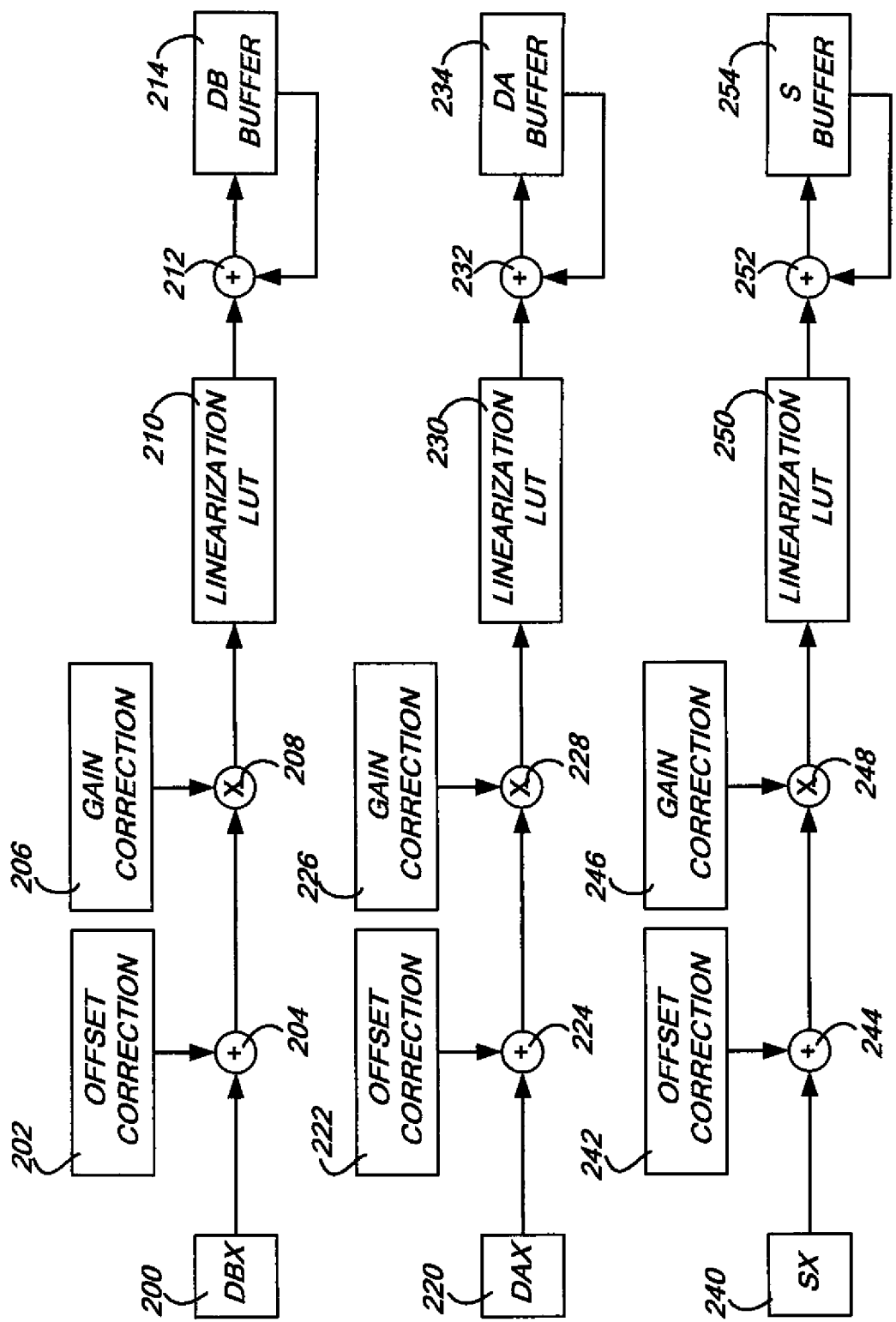
FIGS. 3A and 3B illustrate the processing applied to the captured dark frames and scene frames to produce a single image.
Figure 3B:
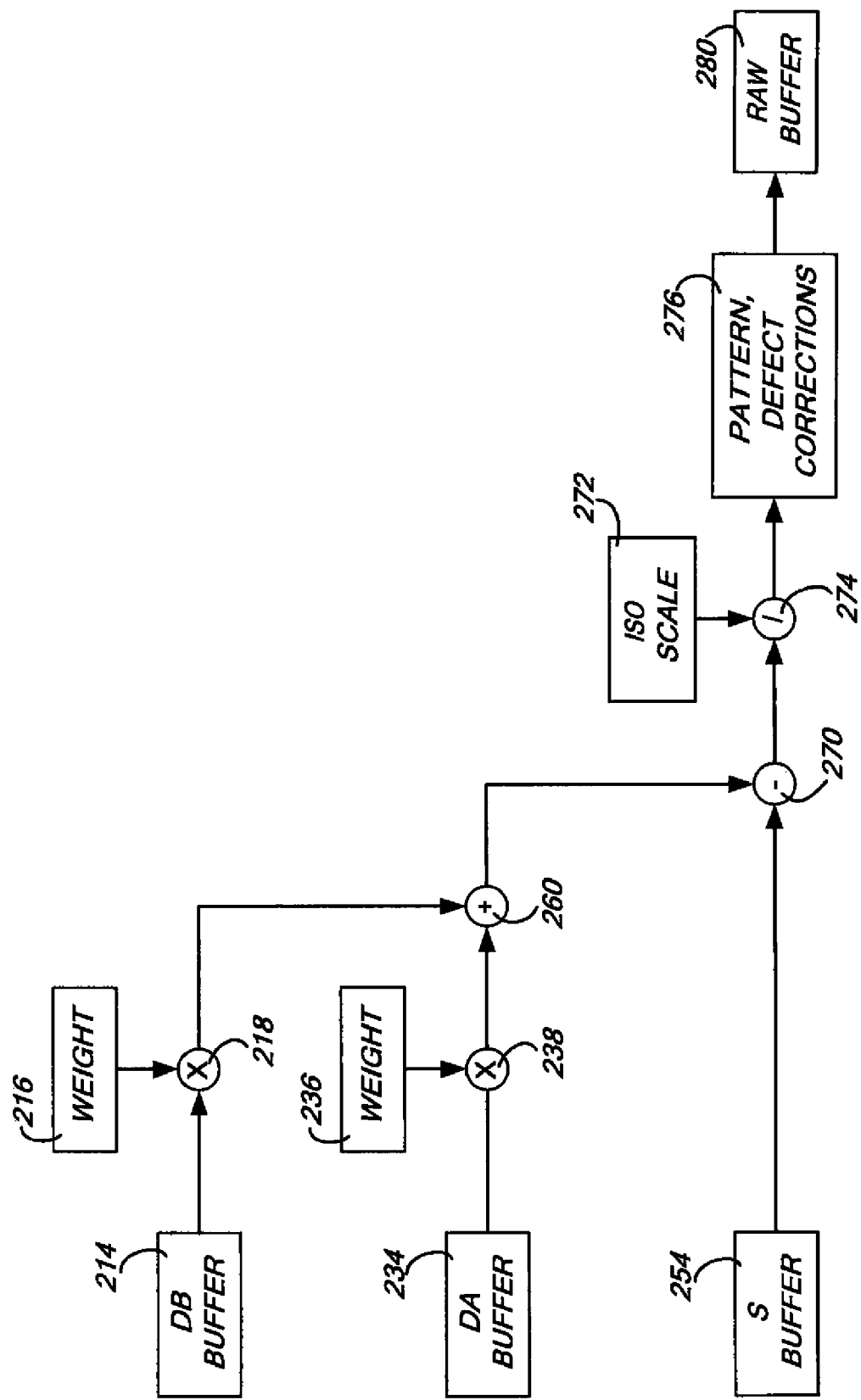

FIGS. 3A and 3B illustrate the processing applied to the captured dark and scene frames to produce a single image. The processing shown in FIG. 3A is performed during the capture of the frames. The processing in FIG. 3B is performed after all frames have been captured and accumulated.

Referring to FIG. 3A, the dark and scene frames are processed similarly. Three process paths are shown for the two sets of dark frames and the set of scene frames. The first path, processing the dark frames captured before the shutter opens will be described in detail, as follows, with the understanding that the same general process is followed for the other frames.

Dark frame DBX (200) represents one of dark frames DB1 through DBN. All these frames are processed identically. Three correction steps are applied according to the invention to each dark frame pixel before it is added to the accumulated total dark frame. First, an offset correction 202 is added (204) to the pixel. Second, the pixel is multiplied (208) by a gain factor 206. These offset and gain values are typically stored as a correction list, one offset or gain value for each sensor column. These corrections must be applied before correcting for image sensor nonlinearity. Linearity correction is applied by a linearization lookup table (LUT) 210. The resulting pixel data is now a linear representation of the pixel charge, with the electrical error effects inherent in the image sensor removed. The pixel is now summed or added to the accumulated sum of the same pixel from previous dark frames. The sum is stored in DB buffer 214. After all the DB frames have been captured and processed, the DB buffer contains the corrected accumulated sum of the first half of the dark frames.

The scene frames which are captured next are processed similarly to the dark frames. Referring to FIG. 3A, the pixels from scene frame SX (240) are processed by adding (244) an offset correction 242, multiplying (248) by a gain correction 246, and applying a linearization table lookup (250). Finally the corrected pixels are added (252) to the accumulated scene frame total and stored in S buffer 254, where the accumulated scene frame total is an image representation of the long exposure as obtained from the plurality of shorter exposure image frames.

The remaining dark frames which are captured after the shutter closes are processed similarly to the other frames. Referring to FIG. 3A, the pixels from dark frame DAX (220) are processed by adding (224) an offset correction 222, multiplying (228) by a gain correction 226, and applying a linearization table lookup (230). Finally the corrected pixels are added (232) to the accumulated scene frame total and stored in DA buffer 234.

While the aforementioned offset corrections 202, 222 and 242, gain corrections 206, 226 and 246, and linearity corrections (applied by the linearity LUTs 210, 230 and 250) are conventional corrections well known to those of skill in this art, they are ordinarily applied to the summed frame signals in the buffers 214, 234 and 254, rather than to the individual frames prior to summing (as shown in FIG. 3A).

After all frames have been captured, buffers 214, 234, and 254 contain corrected dark and scene sums ready for final processing. This processing is illustrated in FIG. 3B. First, the dark frame sums from before and after exposure must be added to produce a single dark value for each pixel. Because the dark frame sum for the scene is represented by the sum of the before dark frames plus the sum of the after dark frames, a linear temperature differential is corrected by the summing process. However, because of the nonlinear dependence on temperature, this gets less accurate with larger temperature differentials. Thus, a weighted sum may be performed to compensate for nonlinear temperature changes during exposure. Accordingly, a pixel value from DB buffer 214 would be multiplied (218) by weight factor 216, and added (260) to a pixel from DA buffer 234 similarly multiplied (238) by weight factor 236. The weighted sum of each dark pixel is a representation of the dark current signal accumulated in the total scene frames for the same pixel.

Weight factors 216 and 236 may be calculated based on the image sensor temperature measured during each scene frame capture. One approach is to accumulate temperature-weighted scaling factors for each dark frame and scene frame to calculate weighting factors for the before sum and the after sum.

$$S_B = \sum_{beforeFrames} 2^{(\Delta T_i/T_D)}$$

$$S_S = \sum_{sceneFrames} 2^{(\Delta T_i/T_D)}$$

$$S_A = \sum_{afterFrames} 2^{(\Delta T_i/T_D)}$$

That is, a sum $2^{(\Delta T_i/T_D)}$ (2 raised to the delta temperature divided by the doubling temperature) is generated for the before (dark) frames, the scene frames, and after (dark) frames. Then, a term $\alpha$ is calculated, which satisfies the equation:

$$S_S = (1-\alpha)S_B + (1+\alpha)S_A$$

where $(1-\alpha)$ and $(1+\alpha)$ are the aforementioned weight factors 216 and 236, respectively. Since $S_S$, $S_B$ and $S_A$ are known, the solution for $\alpha$ is:

$$\alpha = \frac{S_S - S_B - S_A}{S_A - S_B}$$

Note that this weighting assumes the number of dark frames before is equal to the number of before frames after, and that the number of scene frames is equal to the sum of both.

The weighted sum of each dark pixel is then subtracted (270) from the accumulated scene sum for the same pixel. The resulting summed value represents the actual value of light integrated in all the scene frames, and also includes a random noise component (as previously discussed). This sum is then scaled (274) according to the invention by ISO scale factor 272 based on the ISO speed rating selected by the user. More specifically, the ISO scale factor 272 is a function of the inherent ISO speed rating and the ISO speed rating selected by the user. In the preferred embodiment,

ISO SCALE FACTOR=INHERENT ISO/USER-SELECTED ISO

For example, where the inherent ISO speed rating is 200 and the user-selected ISO speed is 50, the ISO scale factor is 4.

Alternatively, since reducing the ISO speed rating increases the overall exposure upon the image sensor, the sum can also be said to be scaled proportional to the increased overall exposure. Since the exposure increase can be characterized in terms of photographic stops, the overall exposure increase according to the preferred embodiment would be at least one stop. (In the above example of an ISO reduction from 200 to 50, the increased exposure is two stops.) In either case, the scaled value has reduced noise because of the averaging of multiple capture frames by the scaling process.

Additional corrections 276 are now applied to the image, exactly as they would be for a single frame capture. These corrections include color pattern, row, column and pixel defect concealment, and the like, depending on the particular image sensor. The corrected raw frame is stored in raw buffer 280. This raw image may be saved or further processed to produce a finished image in a standard format such as JPEG.

Figure 4:
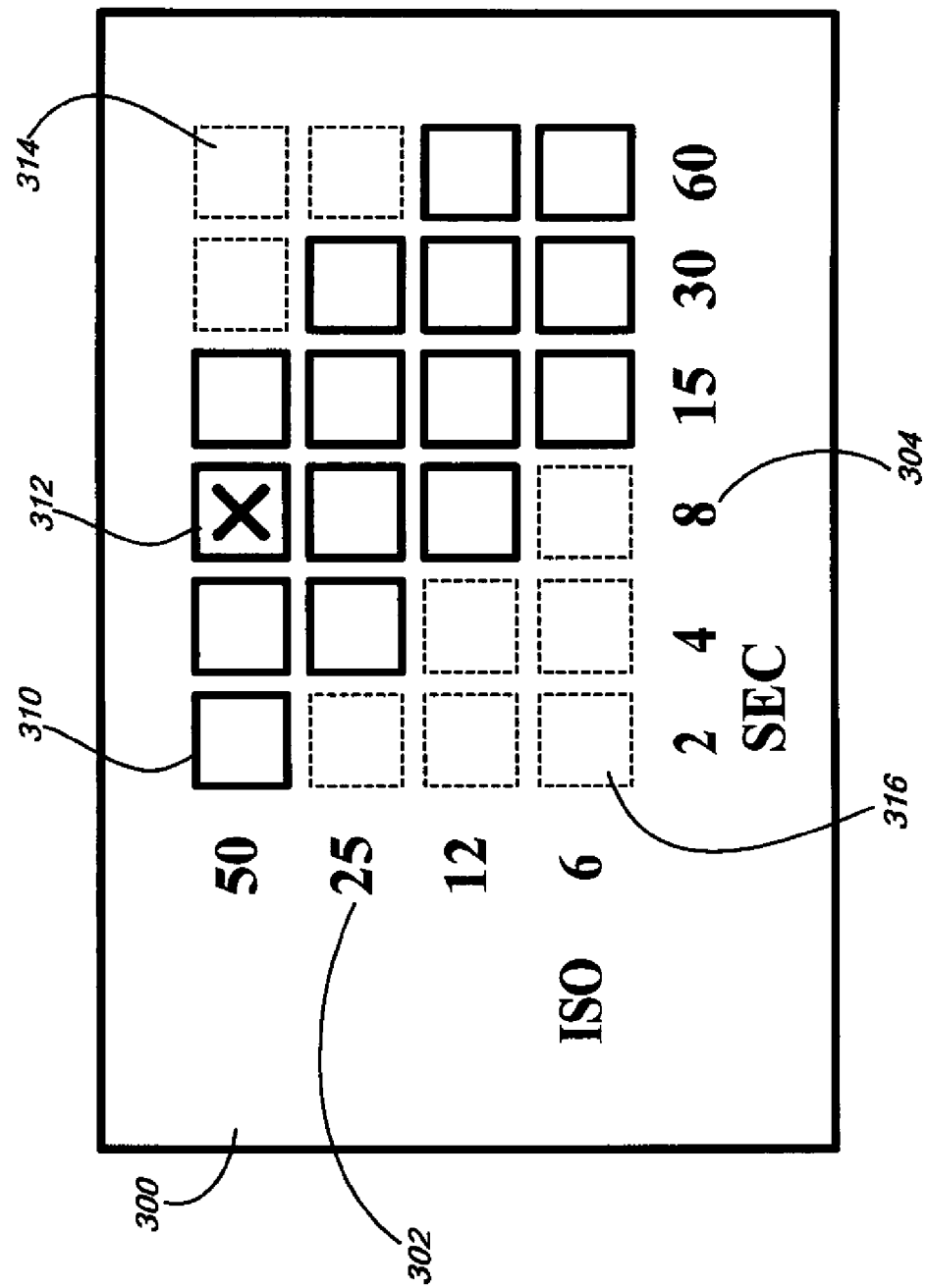
FIG. 4 illustrates a graphical user interface that is employed by the camera shown in FIG. 1 to allow the user to select a combination of exposure time and exposure speed rating (ISO) for a particular image.

FIG. 4 illustrates a graphical user interface display 300 which may be employed to allow the user to select the combination of exposure time and exposure index (ISO) for a particular shot. Not all combinations of these two parameters will produce acceptable images, so this interface presents the allowable combinations in a simple chart format. It will be obvious that the standard camera controls to select ISO and shutter speed could be used, but would be less convenient for the user. (It should be further understood a similar effect could be obtained if the user interface display 300 presented the ISO data in other terms, e.g., in terms of a progressive increase (say, 2, 3, 4, etc. stop increases) in the overall exposure.)

Referring to FIG. 4, the display 300 contains icons 310 for each allowed combination of ISO speed and exposure time. These icons are arranged in a chart, labeled for time (304) and ISO speed (302). The user may select the desired exposure combination by moving highlight icon 312 on the chart, using buttons, a joystick or other user input device. Locations on the chart corresponding to combinations that are not allowed do not display an icon (and are shown in broken line 314, 316 in FIG. 4) or are otherwise de-emphasized relative to permitted icons 310.

Some combinations 316 are not allowed because the image sensor might be saturated. For example, if the image sensor has an inherent ISO speed of 200, a 2 second exposure at ISO 50 is the shortest allowed. This is because each scene frame in a 2 second exposure will integrate ¼ of the total exposure light. Thus, the maximum integrated light in a single frame would be equivalent to that in a single frame ISO 200 exposure. A 2 second exposure below ISO 50 might overexpose or saturate the sensor and result in a poor image.

Some combinations 314 are not allowed because the image will be too noisy. At higher ISO speeds, less light is integrated in each frame and the individual frame signal to noise ratio is lower. As the exposure time is increased, the integrated light is divided among more and more frames and the effect of the noise in each frame will increase, producing an excessively noisy image. As the ISO speed is lowered, the allowed exposure time may be increased, as each frame will integrate more light and the effect of noise is reduced. This illustrates one object of the invention, that of allowing a much lower ISO capture than would be possible in a normal single frame mode. This in turn allows a much longer exposure time to be used while producing a very high quality image.

Figure 5:
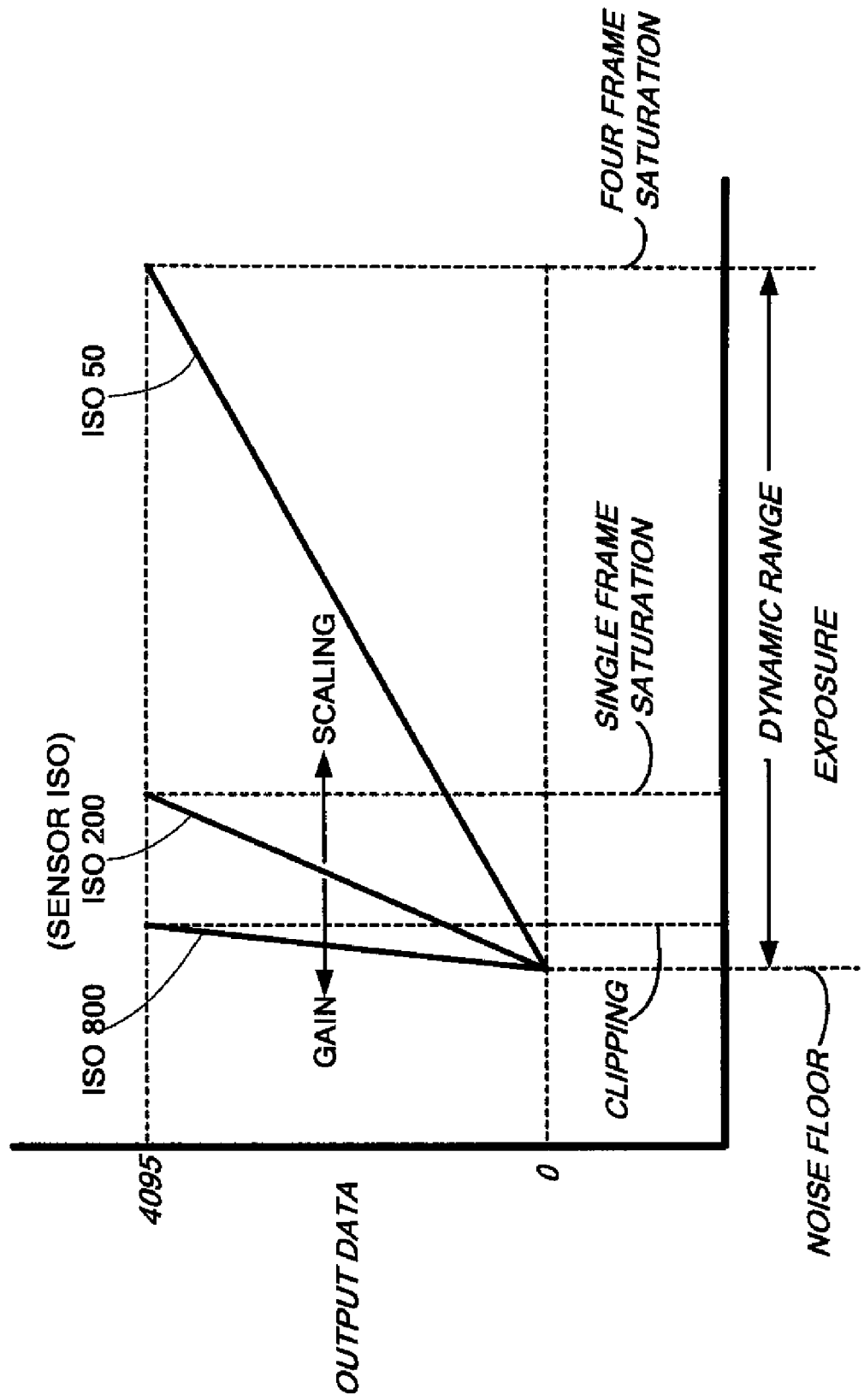
FIG. 5 shows a plot of the transfer function for different exposure speed (ISO) ratings of the camera shown in FIG. 1.

A plot of the transfer function of the camera is shown in FIG. 5. The horizontal axis represents the total exposure on the image sensor. Exposure is a function of scene brightness, lens aperture and exposure time. The vertical axis represents the digital output value of a pixel. In a camera with a 12 bit A/D converter, the output value may range from 0 to 4095 as shown. To illustrate the effect of the present invention, the plot shown does not include typical processing effects such as tone and gamma curves, color balance, etc. Hence, the plot shows a simple linear response to the incident exposure.

Three transfer functions are shown. The ISO 200 function represents the inherent response of the image sensor in a normal single frame capture mode. The effective dynamic range is a function of the saturation level or pixel capacity of the sensor, and the noise floor. Saturation occurs when the number of electrons produced by incident exposure exceeds the pixel capacity. Excess charge is typically drained by an overflow drain structure in the image sensor. The effect is to clip the image at that exposure level such that any pixels in the scene brighter than that level are all recorded at the maximum output value. As a result, no image content is visible in saturated areas. The noise floor is the level at which the total of the various random noise components inherent in the sensor and electronics exceed the image signal. The dynamic range of the sensor is the range of light between these two levels and is a significant contributor to perceived image quality.

When analog or digital gain is applied to the signal from the image sensor, the transfer function moves to the left as illustrated by the ISO 800 line. The gain applied is controlled by the user by setting the camera ISO control to a higher value than the inherent ISO speed of the image sensor. When this is done, the maximum light level that can be recorded is now limited by the range of the A/D converter and is marked on the plot as the clipping level. Very bright points in the scene may still reach the saturation level of the image sensor, but all values above the clipping level are represented by the maximum digital value. Thus, the dynamic range of the image is reduced, but the effective ISO speed is increased, allowing image capture with lower exposure levels. This is analogous to using a higher speed film in a film camera. Higher speed films normally exhibit greater graininess than lower speed films and the effect of the decreasing dynamic range or signal to noise ratio in a digital camera has a similar effect on image quality.

The prior art digital camera does not ordinarily provide an ISO setting below the inherent speed of the image sensor. Lowering the ISO setting according to the invention would cause the camera to increase the exposure on the image sensor and more of the image exposure range would be beyond the saturation level of the image sensor, resulting in unacceptable loss of highlight image structure. The effect of the present invention is illustrated by the third transfer function. By scaling the digital data, the effective gain is lowered and the dynamic range extended. This is possible because multiple frames are captured and summed, so that the image sensor effective saturation level is multiplied. In other words, a pixel can be filled to capacity multiple times, as the pixel is reset or discharged as each frame is read out. Since the total signal is accumulated as digital data in memory, rather than as charge in the sensor, the individual frames may be summed without clipping due to the saturation level of the image sensor. In the illustrated embodiment, the single frame saturation level of the sensor produces output data of 4095, the maximum A/D output value. This value is stored as a 12 bit binary number. However, the accumulated sum of the frames may be stored in memory as a 16 or 32 bit value, providing much larger total signal capacity. In the plot, the four frame saturation level is shown. This is four times the single frame saturation level and is the new effective saturation or maximum exposure level for the ISO 50 setting. Thus, the dynamic range is extended as shown on the plot and much higher total exposure levels are possible, as may occur with very long exposure times.

The ISO setting may be reduced as low as is desired, increasing the exposure on the sensor, scaling the data accordingly and further extending the dynamic range. However, the minimum exposure time is increased in proportion to the reduction in ISO setting. For example, with a sensor readout time of ½ second, the minimum exposure time at ISO 50 is 2 seconds, the readout time of four frames. Thus, with the same sensor readout time, the minimum exposure time at ISO 25 is 4 seconds, the readout time of 8 frames, and so on.

The invention has been described in detail with particular reference to certain preferred embodiments thereof, but it will be understood that variations and modifications can be effected within the spirit and scope of the invention.

PARTS LIST 10 light
11 imaging stage
12 lens
14 mirror
16 brightness sensor
18 focal plane shutter
20 image sensor
22 analog signal processor
24 A/D converter
26 timing generator
30 bus
32 memory
34 host interface
36 digital signal processor (DSP)
38 processing stage
40 exposure controller
50 system controller
52 bus
54 program memory
56 system memory
60 memory card interface
62 socket
64 memory card
68 user interface
70 viewfinder display
72 exposure display
74 user inputs
76 status display
80 video encoder
82 display controller
88 image display
100 first curtain operation
102 second curtain operation
104 first curtain open
106 second curtain closes
110-123 dark frames
131-134 scene frames
141-143 dark frames
200 dark frames DBX
202 offset correction
204 summing stage
206 gain correction
208 multiplication stage
210 linearization stage
212 summing stage
214 DB buffer
216 weight factor
218 multiplication stage
220 dark frames DAX
222 offset correction
224 summing stage
226 gain correction
228 multiplication stage
230 linearization stage
232 summing stage
234 DA buffer
236 weight factor
238 multiplication stage
240 image frames SX
242 offset correction
244 summing stage
246 gain correction
248 multiplication stage
250 linearization stage
252 summing stage
254 S buffer
260 summing stage
270 subtracting stage
272 ISO scale factor
274 scaling stage
276 additional corrections
280 raw buffer
300 graphical user interface display
302 ISO speed
304 time
310 icon
312 highlight icon
314 disallowed noisy combinations
316 disallowed overexposure combinations

The invention claimed is:

1. A method for capturing a long exposure with a digital camera by dividing the long exposure into a plurality of shorter exposures, wherein the digital camera includes an image sensor that (a) is assigned an inherent ISO speed rating that determines at least in part an overall photographic exposure upon the image sensor, and (b) generates an image signal for each shorter exposure and a dark current comprising both a fixed pattern offset component and a random noise component, said method comprising the steps of:
increasing the overall photographic exposure upon the image sensor;
capturing the shorter exposures as a plurality of image frames;
generating an image representation of the long exposure from the plurality of image frames;
generating a representation of the dark current in the plurality of image frames;
processing the image representation and the representation of the dark current in order to remove the fixed pattern offset component of the dark current from the image representation, thereby generating a processed image representation; and
scaling the processed image representation proportional to the increased overall photographic exposure whereby the scaling additionally reduces the random noise component in the image representation; wherein the step of processing the image representation and the representation of the dark current comprises subtracting the representation of the dark current from the image representation.

2. The method as claimed in claim 1 wherein the step of reducing the ISO speed rating for the shorter exposures increases the amount of light incident upon the image sensor during the shorter exposures.

3. The method as claimed in claim 1 further comprising the step of displaying a plurality of different longer exposure times and at least one reduced ISO speed rating that is appropriate for each longer exposure time.

4. A method for calculating a dark current from a plurality of dark frames captured by an image sensor, said method comprising the steps of:
generating a plurality of dark frames;
for each dark frame, performing at least one correction for electrical error effects in the image sensor, thereby generating a corrected dark frame;
combining the corrected dark frames to provide a representation of the dark current;
wherein the correction for electrical error effects in the image sensor comprises correcting for an offset correction, a gain correction and a non-linearity correction and the offset correction and the gain correction are performed before the non-linearity correction; and, weighting the dark frames using individual scaling factors based on temperature chance for each dark frame to compensate for nonlinear temperature change.

5. The method as claimed in claim 4 wherein the weighting is performed on the representation of dark current output from the step of combining the corrected dark frames.

6. In a method for enabling a user to interface with a digital camera in order to capture a long exposure by dividing the long exposure into a plurality of shorter exposures, wherein the digital camera includes an image sensor rated for a predetermined, inherent ISO speed rating, the improvement wherein the user interface comprises the steps of:

displaying a chart showing a plurality of different longer exposure times that are available and at least one reduced ISO speed rating that is appropriate for each longer exposure time; and selecting a reduced ISO speed rating from the chart and accordingly reducing the ISO speed rating for the shorter exposures below the inherent ISO speed rating such that the image signal for each shorter exposure accumulates to a greater extent than if the inherent ISO speed rating been used.

7. The method as claimed in claim 6 further including the step of de-emphasizing on the chart of reduced ISO speed ratings certain combinations of ISO speed rating and exposure time.

8. The method as claimed in claim 7 wherein the certain combinations provide unacceptable image quality.

9. A digital camera for capturing a long exposure by dividing the long exposure into a plurality of shorter exposures, said digital camera including an image sensor, rated for a predetermined, inherent ISO speed rating, that generates an image signal for each shorter exposure and a dark current comprising both a fixed pattern offset component and a random noise component, said digital camera comprising:

a user interface for reducing the ISO speed rating for the shorter exposures below the inherent ISO speed rating such that the image signal for each shorter exposure accumulates to a greater extent than if the inherent ISO speed rating been used;

an imaging stage for capturing the shorter exposures as a plurality of image frames; and a processing stage for (a) generating an image representation of the long exposure from the plurality of image frames, (b) generating a representation of the dark current in the plurality of image frames, (c) processing the image representation and the representation of the dark current in order to remove the fixed pattern offset component of the dark current from the image representation, and (d) scaling the image representation proportional to the reduced ISO speed rating whereby the scaling additionally reduces the random noise component in the image representation.

10. The camera as claimed in claim 9 wherein the processing stage generates an image representation of the long exposure by summing the image frames.

11. The camera as claimed in claim 10 wherein the processing stage further weights the dark frames proportional to temperature change.

12. The camera as claimed in claim 9 wherein the processing stage generates a representation of the dark current by capturing a plurality of dark frames and summing the dark frames.

13. The camera as claimed in claim 12 wherein the imaging stage captures at least one dark frame before the image frames are captured and captures at least one additional dark frame after the image frames are captured.

14. The camera as claimed in claim 9 wherein the processing stage processes the image representation and the representation of the dark current comprises by subtracting the representation of the dark current from the image representation.

15. The camera as claimed in claim 9 further comprising an exposure controller for controlling the exposure upon the image sensor.

16. The camera as claimed in claim 15 wherein, when the user selects a reduced ISO speed rating for the shorter exposures, the exposure controller controls the exposure to increase the amount of light incident upon the image sensor during the shorter exposures.

17. A digital camera for capturing a long exposure by dividing the long exposure into a plurality of shorter exposures, said digital camera including an image sensor rated for a predetermined, inherent ISO speed rating, said digital camera comprising:

a user interface employing a chart representation of a plurality of different longer exposure times that are available and at least one reduced ISO speed rating that is appropriate for each longer exposure time; and a processing stage responsive to user selection of a reduced ISO speed rating from the chart and accordingly reducing the ISO speed rating for the shorter exposures below the inherent ISO speed rating such that the image signal for each shorter exposure accumulates to a greater extent than if the inherent ISO speed rating been used.

18. The camera as claimed in claim 17 wherein the chart of reduced ISO speed ratings de-emphasizes certain combinations of ISO speed rating and exposure time.

19. The camera as claimed in claim 18 wherein the certain combinations provide unacceptable image quality.

20. A digital camera for capturing a long exposure by dividing the long exposure into a plurality of shorter exposures, said digital camera includes an image sensor that (a) is assigned an inherent ISO speed rating that determines at least in part an overall photographic exposure upon the image sensor, and (b) generates an image signal for each shorter exposure and a dark current comprising both a fixed pattern offset component and a random noise component, said camera comprising:

an exposure controller for controlling the overall photographic exposure upon the image sensor;

a display for displaying a chart showing a plurality of different longer exposure times that are available and at least one reduced ISO speed rating that is appropriate for each longer exposure time; and a user input for selecting a reduced ISO speed rating from the chart and accordingly reducing the ISO speed rating for the shorter exposures below the inherent ISO speed rating such that the image signal for each shorter exposure accumulates to a greater extent than if the inherent ISO speed rating been used;

an imaging stage for capturing the shorter exposures as a plurality of image frames;

a processing stage for (a) directing the exposure controller to increase the overall photographic exposure upon the image sensor during the shorter exposures, (b) generating an image representation of the long exposure from the plurality of image frames, (c) generating a representation of the dark current in the plurality of image frames, (d) processing the image representation and the representation of the dark current in order to remove the fixed pattern offset component of the dark current from the image representation, thereby generating a processed image representation, and (e) scaling the processed image representation proportional to the increased overall photographic exposure whereby the scaling additionally reduces the random noise component in the image representation.

21. The camera as claimed in claim 20 wherein the processing stage generates an image representation of the long exposure by summing the image frames.

22. The camera as claimed in claim 20 wherein the processing stage generates a representation of the dark current by capturing a plurality of dark frames and summing the dark frames.

23. The camera as claimed in claim 22 wherein the imaging stage captures at least one dark frame before the image frames are captured and captures at least one additional dark frame after the image frames are captured.

24. The camera as claimed in claim 22 wherein the processing stage further weights the dark frames proportional to temperature change.

25. The camera as claimed in claim 20 wherein the processing stage processes the image representation and the representation of the dark current comprises by subtracting the representation of the dark current from the image representation.

* * * * *